March 10, 1970     C. V. PARKER     3,500,406

DIRECTIVE RESPONSE TRANSPONDER SYSTEM

Filed Aug. 29, 1968

INVENTOR
CARLYLE V. PARKER

BY

ATTORNEY

United States Patent Office 3,500,406
Patented Mar. 10, 1970

3,500,406
DIRECTIVE RESPONSE TRANSPONDER SYSTEM
Carlyle V. Parker, Alexandria, Va., assignor to the United States of America as represented by the Secretary of the Navy
Filed Aug. 29, 1968, Ser. No. 756,243
Int. Cl. G01s 9/56
U.S. Cl. 343—6.5        7 Claims

ABSTRACT OF THE DISCLOSURE

A mobile transponder system including directional antennas and a matrix-like array of AND logic gates having two sets of inputs. The first set receives a signal representative of the compass bearing of the mobile transponder, and the second set receives a signal representative of the direction of interrogation of the ground control station signal. The array automatically computes relative bearing and connects the proper antenna to the system.

STATEMENT OF GOVERNMENT INTEREST

Figure 1:
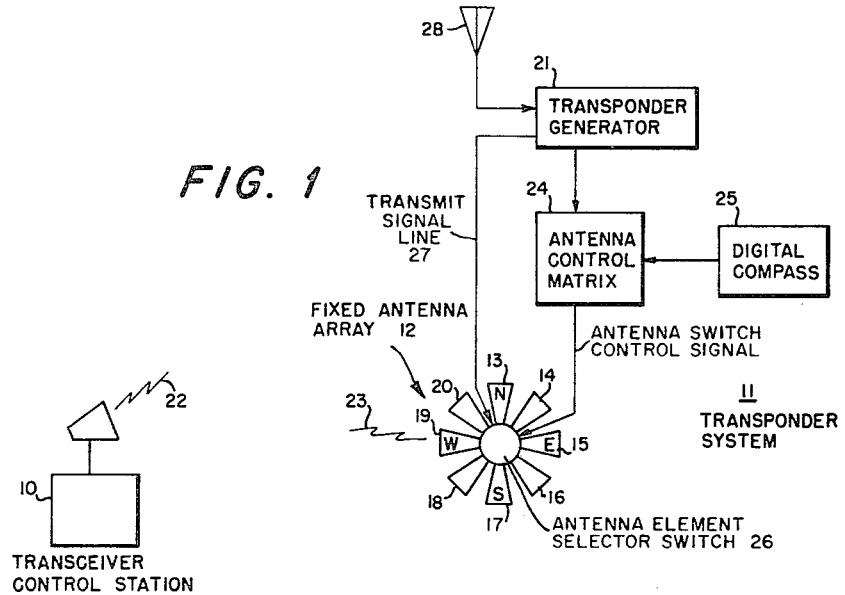

The invention described herein may be manufactured and used by or for the Government of the United States of America for governmental purposes without the payment of any royalties thereon or therefor.

BACKGROUND OF THE INVENTION

The present invention relates to a method and apparatus for providing directive communication signals from one station to another and more particularly to a method and system for communication wherein the response signal from a controlled transmitter is directed toward the location of the controlling station automatically.

Because of their obvious importance, electronic transponder systems have been the object of intensive development efforts. They have received widespread use in the field of air craft identification, for example, IFF (Indentification Friend or Foe) systems, and in controlling and utilizing satellites.

While previous systems have in general proven to be satisfactory, they have lacked the capability of replying only in the direction of the interrogating station. Because of the omni-directional nature of the reply transmitted by the transponder in previous systems, stations other than the interrogating station receive the transponder reply signal. This is particularly undesirable in wartime, since the enemy is able to monitor and successfully decode the information being transmitted. Furthermore, because of the high power demands of the inefficient omni-directional transponder antenna, the size of the transponder equipment is undesirably large.

U.S. Patent 3,274,598 shows one attempt to solve the above problems. The system disclosed therein, however, suffers from certain defects and has not proven to be entirely satisfactory. One particular problem which has not been solved by the prior art is the elimination of the requirement that the ground control station operator manually compute relative bearing of the mobile station with respect to the particular ground station so as to inform the mobile system as to the proper direction for response.

OBJECTS OF THE INVENTION

It is, therefore, an object of the present invention to provide a method of communication wherein the reply of a controlled transmitter is automatically directed towards a control station.

Another object of the invention is to provide a communication system wherein the reply of a controlled transmitter is automatically directed toward a control station.

Still another object of the invention is the provision of a method and apparatus to automatically compute the relative bearing of a vehicle.

A further object of the invention is the provision of a transponder system having circuitry which automatically directs the transponder to reply only in the direction of the interrogating station.

Other objects and many of the attendant advantages of this invention will be readily appreciated as the same becomes better understood by reference to the following detailed description of the preferred embodiment of the invention when considered in connection with the accompanying drawings in which like reference numerals designate like parts throughout the figures thereof and wherein:

FIG. 1 illustrates the invention in block diagram form; and

Figure 2:
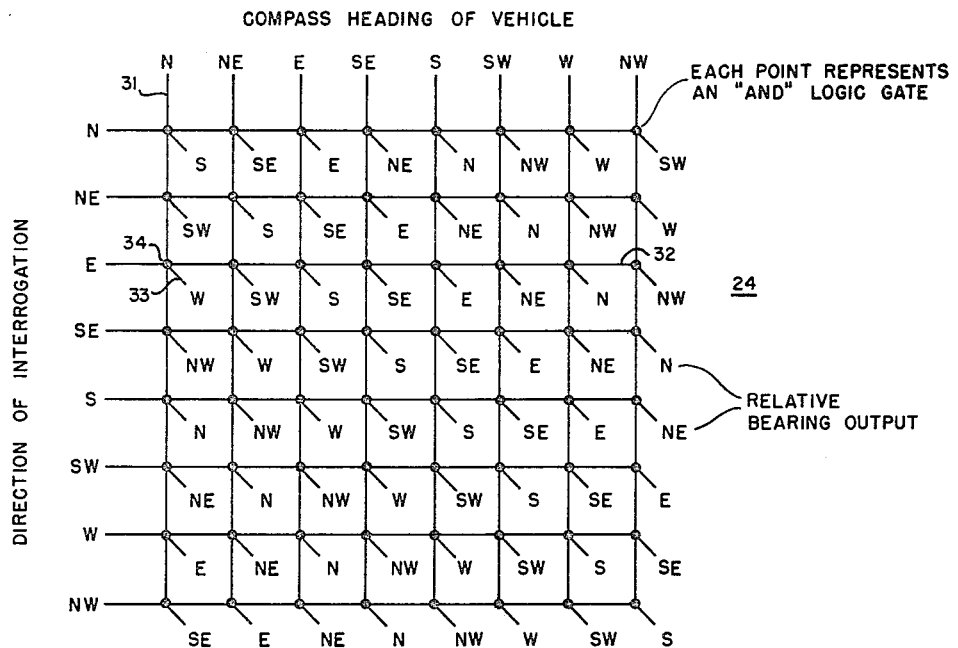

FIG. 2 indicates the construction and operation of the antenna control matrix used in the system of FIG. 1.

DESCRIPTION OF THE PREFERRED EMBODIMENT

The invention contemplates a communication system which includes a control station and a controlled transponder having an array of directional antennas that are fixedly mounted upon a vehicle. The control station transmits a coded signal indicative of the direction of interrogation which is received at the transponder and fed to one side of an eight-by-eight matrix-like array of AND logic gates. The other side of said matrix-like array receives information relating to the compass heading of the controlled transponder. The antenna control matrix utilizes this information to automatically compute the relative bearing of the controlled transponder with respect to the ground control station and in response thereto, activates the proper directional antenna through a switch to provide efficient directive communication only to said control station. The system is entirely electronic, requires no moving parts and is extremely efficient. Furthermore, the provision of fixedly mounting the directional antennas of the controlled transponder on the vehicle eliminates the necessity for bulky servo motor drive control devices, which require constant and expensive maintenance.

Referring now to FIG. 1, the transceiver ground control station 10 could, depending upon the operational circumstances, be located aboard a moving vehicle or could be fixed in position at a land installation, such as a satellite observation station. Similarly, the transponder system 11 could, depending upon the nature of the operational system, be contained on a moving vehicle, typically an airplane or a satellite. The transponder system 11 includes an antenna array 12 including a number of directional antenna elements 13–20, illustrated as eight in number although more or less could obviously be used. The individual antenna elements 13–20 are fixedly mounted on the vehicle with equi-angular spacing therebetween along the circumference of a circle with their respective directional patterns oriented outwardly from the center of the circle. Thus, the compass bearing of the directivity pattern of each of the elements of the antenna array 12 is constantly varying as the heading of vehicle changes. The notation used for each of the elements 13–20 of the fixed antenna array 12 indicates the respective position of the antenna elements with respect to the vehicle upon which it is carried, with north (N) referring to the forward end. The notation does not refer to the actual compass heading of the elements. The antenna array further includes an antenna element selector switch 26 which couples a single antenna element to the output of transponder generator 21 via line 27 in response to a relative bearing control signal produced by antenna control matrix 24. The switch 26 may be any conventional controllable antenna selector switch, such as that shown in Fig. 4.54 of Radio Antenna Engineering by E. A. Laport, McGraw-Hill 1952, pp. 432–435, the particular design characteristics being within the realm of mechanical skill of one of ordinary skill in the art.

As is conventional with such units, the transponder system 11 includes an electronic transponder generating system 21 which is coupled to antenna array 12 via signal line 27 to permit a response to a signal 22, received from the control station at antenna 28 by generating a signal 23 which is transmitted back to the control station. The signal 23 could, in an IFF system, be a response in predetermined code to the interrogation signal 22; or, in the case of a satellite, the signal 23 could be representative of data sensed and stored by the satellite when beyond the radio range of the control station.

The transponder system 11 further includes an antenna control matrix array 24 which, in response to certain characteristics of the signal 22, after receipt by transponder generator 21, and a second signal from digital compass 25, controls the antenna array 12 to transmit the signal 23, produced by transponder generator 21, from only one of the fixed directional antennas 13–20. The particular arrangement of antenna control matrix circuit 24 will be further explained in connection with FIG. 2. It is noted that the particular characteristics and the exact nature of the signals 23 generated by transponder generator 21 do not form a part of this invention and are matters of engineering design well known to those skilled in the art.

Digital compass 25 produces a binary coded signal representative of the compass heading of the vehicle; and the ground control station 10, by appropriate coded techniques, transmits directional information relating to the compass bearing of the transponder system 11 as measured at the fixed location point of the ground control station 10; i.e., the compass bearing of the direction of interrogation. The antenna control matrix 24 analyzes both the binary coded output signal from the compass 25 and the received directional information decoded by transponder 21 from the transmitted signal 22 to provide an output signal representative of the relative bearing of the vehicle with respect to the control station.

Referring now to FIG. 2, there is diagrammatically illustrated the circuitry of antenna control matrix 24. The antenna control 24 is in the form of an eight-by-eight matrix of AND logic gates wherein each intersecting point represents a single AND gate. In the figure, the vertical bars, exemplified by bar 31, receive the binary coded compass bearing signal from digital compass 25; and the horizontal bars, exemplified by bar 32, are adapted to receive the directional information signal transmitted by control station 10 and decoded by transponder 21. A signal of either positive or ground potential, corresponding to a binary "1" or "0," respectively, will be applied to each of the vertical and horizontal bars depending upon the relative bearing of the vehicle with respect to the ground station. It is noted that in the embodiment shown in FIG. 2 any of eight possible signals may be fed into the antenna control matrix 24 by the digital compass 25 and by the transponder generator 21. It is obvious that a greater or lesser number of bars may be provided in the matrix according to the directional characteristics of the antenna elements 13–20 used and the system accuracy desired. The short 45 degree lines, exemplified by line 33, provide binary coded output signals from the antenna control matrix 24 representative of the relative bearing of the vehicle with respect to the ground station which enable the particular antenna element desired to be rendered operative.

The operation of the transponder system will now be explained. When the operator at control station 10 desires to interrogate the transponder, he will transmit a coded signal indicative of the direction of interrogation of the transponder system 11 at that particular time. Referring to the relative position of the components of the system as shown in FIG. 1, and assuming that the top of the drawing is due north, the direction of interrogation is east. This signal is received by the transponder generator 21 via antenna 28, decoded, and fed to one input side of matrix 24. Since the direction of interrogation is east, in this example horizontal bar 32 will be activated by a binary "1" while the remainder of the horizontal bars receive a binary "0" indicating a deactivated state. The other input side of matrix 24 is coupled to receive the output from digital compass 25 and since the vehicle upon which the transponder system 11 is mounted is heading due north, as shown by the position of antenna array 12, vertical bar 31 will be activated by a binary "1" while the remainder of the vertical bars are maintained deactivated by a binary "0." It can be seen that AND gate 34 will then be enabled because of the coincident receipt of a "1" signal on bar 31 and bar 32. An output signal will therefore appear on control signal line 33 which, when fed to selector switch 26, enables antenna element 19 corresponding to a relative bearing of due west. Signal 23 generated by transponder generator 21 and coupled to array 12 by signal line 27 will then be automatically directed towards the control station 10 by antenna element 19.

The transponder system according to the invention has many advantages over previous transponder systems. The transmission of accurately directional information reduces the risk of unauthorized reception, and allows a tremendous reduction in power requirements thereby permitting savings in both weight and space, which are highly desirable in aircraft and satellite installations. Furthermore, there is provided a system which eliminates error due to the ground control operator's manual calculation of relative bearing. Thus a savings in both time and an improvement in accuracy are provided. In addition, there is disclosed an automatic relative bearing calculation circuit which is particularly suitable for use with transponder systems and has additional uses within the contemplation of those familiar with the art.

In summary, the above described invention provides a method and means of communication wherein the reply of a control transmitter is automatically directed toward a control station. Obviously many modifications and variations of the invention are possible in the light of the above teachings. It is therefore to be understood, that within the scope of the appended claims, the invention may be practiced otherwise than as specifically described.

What is claimed is:

1. A communication system comprising:
   control station means having a particular position for transmitting a first signal representative of the compass bearing of a vehicle as measured at said position;
   first means mounted on said vehicle for receiving said first signal and transmitting a response thereto;
   compass means carried by said vehicle for generating a second signal representative of the compass heading of said vehicle;
   an antenna array coupled to said first means, comprising a plurality of individually operative antenna elements mounted on said vehicle in fixed spatial relation thereto;
   antenna control means comprising a plurality of AND gate circuits connected in a matrix-like array to receive said first signal from said first means and said second signal from said compass means to thereby automatically generate a third signal for rendering operative one of said plurality of antenna elements whereby an accurate directional response from said first means to said control station is provided.

2. The communication system as claimed in claim 1 wherein the number of said AND gate circuits is equal to the square of the number of said antenna elements.

3. The communication system as claimed in claim 1 wherein said antenna elements are mounted equidistant from each other along the circumference of a circle with their respective directional patterns oriented outwardly from the center of said circle.

4. The communication system as claimed in claim 1 wherein said first means is a transponder.

5. A relative bearing calculating circuit for use in navigation systems comprising:
   compass means for providing a first binary coded digital signal representative of the compass heading of a vehicle;
   generator means for providing a second binary coded digital signal representative of the compass bearing of said vehicle as measured at a fixed remote point; and
   AND gate logic circuit means connected in a matrix-like array having a first set of input terminals adapted to receive said first binary coded signal, a second set of input terminals adapted to receive said second binary coded signal, and a set of output terminals for continuously and automatically providing a third binary coded digital output signal representative of the relative bearing of said fixed point with respect to said vehicle.

6. A method for automatically providing transmission from a mobile communication system in the direction of an interrogating station comprising the steps of:
   transmitting a first signal containing particular directional information from said interrogating station;
   receiving said first signal;
   generating a second signal representative of the compass heading of said mobile transponder system;
   directing said first and second signals, respectively, to first and second input sides of a bank of logic gates connected in a square matrix-like array; and
   activating one of a plurality of directional antenna elements in response to an output of said bank of logic gates to thereby enable the transmission of signals in the direction of said interrogating station.

7. A method for calculating the relative bearing of a fixed point with respect to a vehicle comprising the steps of:
   connecting a plurality of AND logic gates to provide a matrix-like array having two input sides each having a plurality of input terminals and a number of output terminals, for providing a third binary coded digital signal representative of the relative bearing of said fixed point with respect to said vehicle;
   generating a first binary coded digital signal representative of the compass heading of said vehicle;
   generating a second binary coded digital signal representative of the compass bearing of said vehicle as measured at said fixed point;
   directing said first signal to one of the input sides of said plurality of logic gates; and
   directing said second signal to the other of the input sides of said plurality of logic gates.

References Cited

UNITED STATES PATENTS 3,274,598 9/1966 Cleeton.
3,298,021 1/1967 Jacobs et al. _____ 343—6.5 X RICHARD A. FARLEY, Primary Examiner M. F. HUBLER, Assistant Examiner U.S. Cl. X.R.

343—6.8, 16, 100